United States Patent Office 3,584,061
Patented June 8, 1971

3,584,061
ACID CATALYSIS OF REACTIONS
Franciszek Olstowski, Freeport, and John D. Watson, Lake Jackson, Tex., assignors to The Dow Chemical Company, Midland, Mich.
No Drawing. Filed Aug. 3, 1964, Ser. No. 387,181
Int. Cl. C07c 39/16
U.S. Cl. 260—619
7 Claims

ABSTRACT OF THE DISCLOSURE

Acid-catalyzed reactions such as aldol condensations, acetal and ketal preparations, esterifications, various hydrolysis reactions, the reaction of a ketone or aldehyde with a phenol to make an alkylidene-bisphenol, and the polymerization of epoxides and the alkylene imines are advantageously carried out when the acid catalyst is graphite or amorphous carbon treated with fuming nitric or sulfuric acids or a mixture of the concentrated acids. The acid catalyst is reusable for successive reactions without rapid diminution of acid strength.

---

The present invention relates to a method for accelerating the progress of chemical reactions normally catalyzed by the presence of an acid. It relates particularly to the use of an acidic material not hitherto employed for such purpose to catalyze acid-promoted organic reactions.

Many organic reactions are promoted by the presence of an acid. It is well known to use small amounts of an acid to catalyze reactions such as certain polymerizations or condensations, esterification, acetal and ketal formation, and hydrolysis of esters, acetals, ketals, lactones, nitriles and the like. Acids commonly used for the purpose are mineral acids such as HCl and $H_2SO_4$, organic acids such as toluenesulfonic acid and trichloroacetic acid, and these or similar acids supported on an inert carrier, for example, a clay, an activated alumina, a diatomaceous earth, silica gel, or charcoal. Acidic ion exchange resins have also been used to catalyze these reactions.

These prior art acid catalysts have certain inherent disadvantages. Yields per unit of acid are often low and undesirable side reactions are catalyzed as well as the main reaction. Free acid catalysts require neutralization or washing steps to remove them from the reaction mixture and these steps not only complicate process procedure but also are likely to cause partial reversal of the reaction. It is ordinarily not practical to recover or reuse either a free acid or a conventional supported catalyst. Ion exchange catalysts are often easily recoverable from reaction mixtures but these materials are subject to attack by heat, strong bases, and some organic solvents. These resins are also affected by ions present in a reaction mixture and must be regenerated before reuse.

It has now been found that many of these difficulties in acid-catalyzed organic reactions which are carried out in the liquid phase at temperatures below about 200° C. are minimized or avoided when there is used as the acid catalyst a non-diamond type of carbon, either graphitic or amorphous, which has been treated at low to moderate temperature with a very strong mineral acid or acid mixture selected from the group consisting of fuming nitric acid, fuming sulfuric acid, and a mixture of 8–98% by weight of concentrated sulfuric acid and 92–2% of concentrated nitric acid. After the acid treatment, excess acid not bound within the carbon structure is preferably removed by drying or, more conveniently, by washing with water or an aqueous solution. By fuming nitric acid is meant red or white fuming nitric acid containing about 85% by weight or more of $HNO_3$. By fuming sulfuric acid is meant anhydrous sulfuric acid containing dissolved $SO_3$. By concentrated nitric and sulfuric acids is meant the commercially available concentrated acids of at least about 65% and at least about 95% concentration respectively. Mixtures of fuming nitric and fuming sulfuric acids are equivalent for this purpose to one of these acids alone.

The acid treatment can be carried out at any temperature below about 150° C. Preferably, the carbon is soaked in the liquid acid at about 0–50° C. until the acid has penetrated all or most of the particle structure and has apparently become intercalated in some way to the carbon structure so that repeated washing with water will not substantially alter the acidic character of the treated carbon. Soaking times of 1–100 minutes are ordinarily sufficient, depending upon the particle size and porosity of the carbon being treated. An acidified carbon suitable for use as a catalyst according to the present invention is one which will impart a pH less than 5.0 to distilled water after having been washed five times at 20–30° C. with portions of water sixty times its weight.

In some way not as yet thoroughly understood, carbon treated as described above retains acid bodies tenaciously within its structure and, being resistant to chemical or solvent attack, can be recovered and reused many times as an acid catalyst without substantial loss of its acidic nature. Catalysts prepared according to the procedure described above not only retain their acidic nature after repeated washings with water or other solvents but also withstand limited contact with basic solutions. Limited exposure to elevated temperatures up to about 200° C. cause little or no loss of acid. A particular advantage of these catalysts is the fact that they are easily and completely removed from reaction mixtures without leaving any significant amount of acid residues in the product. When their acid content has been depleted through extensive use, these catalysts can be regenerated by repeating the acid treatment.

The treatment of carbon with strong acids other than those described above yields only carbon containing more or less acid loosely absorbed such as has been used previously as a formed of supported acid catalyst. These acids are easily and substantially completely removed from the carbon by only one or two washes with water. Acids such as phosphoric acid, perchloric acid, hydrochloric acid, and surprisingly, ordinary concentrated nitric and sulfuric acids when used separately are thus loosely held by graphite or amorphous carbon.

The quantity of acid used to treat the carbon is not critical, but for economy and convenience, only enough acid to wet the carbon thoroughly is ordinarily used. Preferably, at least about 0.1 part by weight of acid per part of carbon is employed and a weight of acid about equal to the weight of carbon is a convenient quantity.

Any amorphous or graphitic carbon can be used to prepare these catalysts. Petroleum coke, activated charcoal, natural flake graphite, so-called amorphous graphite, or graphite made by heating amorphous carbon to very high temperatures are all suitable. These can be in powder, granular, or pelleted form, preferably in a state such that all or substantially all of the carbon is easily contacted with the liquid acid.

Any liquid phase organic reaction which is catalyzed at temperatures below about 200° C. by the presence of a small amount of a strong mineral acid is effectively catalyzed by these acid-treated carbons. Any significant quantity of acid-treated carbon will act catalytically. Preferably, about 0.2–15% by weight is employed based on the total weight of reactants. Representative reactions include the aldol condensation of aliphatic aldehydes and ketones, the formation of acetals, ketals, and mercaptals by the reaction of an alcohol or thiol with an aldehyde or ketone, esterification reactions, the reaction of a carbonyl compound with a phenol to make a bisphenol, the hydrolysis or alcoholysis of esters, acetals, ketals, lactones, nitriles, and the like, and the polymerization of such compounds as p-dioxanone, alkylene oxides, and alkylene imines. Particularly advantageous results in the way of increased yields per unit of acid and reduced yields of byproducts are obtained with these acidified carbon catalysts in reactions involving the carbonyl function either as a reactant or as a product. Some of these reactions are illustrated by the examples which follow. Examples 1 and 2 show catalyst preparation.

EXAMPLE 1

Commercially available natural flake graphite in 20–70 mesh form was stirred with an equal weight of a mixture of one part of 70% $HNO_3$ and one part of 98% $H_2SO_4$. The thick graphite-acid slurry was allowed to stand at room temperature for about 30 minutes and then was put in a filtration apparatus where it was washed and filtered five times, using each time a weight of water that was twice the weight of the graphite. After the final wash and filtration, the acid-treated graphite was air dried and stored for use.

The stability of this acidified graphite was demonstrated by putting a sample in excess dilute sodium hydroxide solution and letting this mixture stand at pH 12.2 for two months in a closed container at room temperature. The graphite was then filtered out and washed six times with portions of water twenty times its weight. Ten grams of the washed graphite was put in 600 ml. of distilled water (of initial pH 5.8) and allowed to stand in a closed container. After 24 hours, the supernatant water had a pH of 4.2. Evidently, at least a substantial portion of the acid molecules were intercalated within the carbon structure or held between carbon lamellae in such a way that the molecules of base could not reach and thereby neutralize them.

Another sample of the acid-treated graphite product was heated at 500° C. and the gases evolved were analyzed in a mass spectrometer with the following results:

$SO_2$—54 parts per million (of treated graphite)
$NO_2+NO$—10,080 p.p.m.
$CO_2+CO$—4954 p.p.m.

Acid-treated carbon catalysts of the present invention will retain their acidity through prolonged leaching with water or other solvent and are, therefore, suitable for repeated reuse to catalyze reactions. Carbon treated with other acids lose absorbed acid rapidly on washing and cannot be reused in this way.

EXAMPLE 2

The comparative stability of the acid-treated carbon catalysts of this invention is shown in the following series of experiments where various acid-treated carbons were subjected to repeated washings. Each wash consisted of stirring ten grams of treated carbon in 600 ml. of distilled water (pH 5.8), letting the mixture stand in a closed container for 2–7 days, measuring the pH of the water, and filtering out the carbon. The acid-treated carbons were prepared by the procedure shown in Example 1.

| Carbon substrate | Acid used | pH of water wash No. | | | | | |
|---|---|---|---|---|---|---|---|
| | | 1 | 3 | 5 | 10 | 15 | 20 |
| Natural flake graphite | 85 $H_2SO_4$,[1] 15 $HNO_3$ | 2.0 | 3.2 | 3.6 | 4.1 | 3.9 | 3.9 |
| Synthetic graphite | Same as above [1] | 2.5 | 4.4 | 4.4 | 4.5 | 4.9 | 5.1 |
| Fluid coke | do | 3.8 | 4.8 | 4.9 | 4.9 | 5.5 | |
| Coconut carbon | do | 1.5 | 2.8 | 3.4 | 3.8 | 4.3 | 4.5 |
| Natural flake graphite | 38% HCl | 2.7 | 5.3 | | | | |
| Do | 86% $H_3PO_4$ | 2.8 | 5.3 | | | | |
| Do | 70% $HNO_3$ | 2.6 | 5.5 | | | | |
| Do | 98% $H_2SO_4$ | 2.5 | 5.1 | | | | |
| Do | Glacial acetic acid | 3.7 | 5.4 | | | | |

[1] 98% $H_2SO_4$ and 70% $HNO_3$ were used.

It is seen that acid-treated carbon catalysts of the present invention retain their acidity up to 15–20 or more water washes while other acid-treated carbons lose essentially all acidity after about two such washes.

EXAMPLE 3

The grams of the acid-treated graphite of Example 1, 48 g. of methanol, and 12 g. acetone were stirred together at —30° C. in a reaction flask for 30 minutes. The cold reaction mixture was filtered to separate the catalyst. A large excess of aqueous sodium hydroxide was added to cold filtrate, thereby causing separation of the dimethyl ketal of acetone produced as a lower layer. Five grams of the ketal was obtained as a pure compound.

EXAMPLE 4

Example 3 was repeated using the recovered graphite catalyst. A similar yield of ketal was obtained.

EXAMPLE 5

A mixture of 19.2 g. of methanol, 29.2 g. of cyclohexanone, and 2.5 g. of a catalyst prepared as in Example 1 by treating activated charcoal with mixed concentrated sulfuric and nitric acids in 85–15 proportion by weight was stirred for 20 hours at —10° C. After filtration of the reaction mixture and neutralization of the cold filtrate, the filtrate was found to contain 10.6 g. of the dimethyl ketal of cyclohexanone.

Example 3 was repeated using catalysts prepared by treating natural graphite with fuming sulfuric acid and red fuming nitric acid respectively and water washing and drying as in Example 1. Results similar to those of Example 3 were obtained. When the experimental procedure was repeated with graphite similarly treated with conc. hydrochloric acid, perchloric acid, $CrO_3$, or phosphoric acid and washed as before, little or no ketal formation was observed.

EXAMPLE 6

A catalyst was prepared as described in Example 1 by treating activated coconut charcoal with about an equal weight of mixed 70% $HNO_3$ and 98% $H_2SO_4$ in 15/85 weight proportion. Five grams of the washed and dried catalyst was stirred with 33 g. of ethyl alcohol and 17 g. of acetaldehyde at about 24° C. for 16 hours. The catalyst was filtered from the reaction mixture and the filtrate was neutralized with dilute aqueous sodium hydroxide. The above procedure was repeated twice, each time using the catalyst recovered from the previous experiment. The three reaction products were found to contain diethyl acetal in quantities of 23.5 g., 25.5 g., and 26.5 g. respectively.

EXAMPLE 7

Using a catalyst similar to that of the foregoing example, 100 g. of benzyl alcohol, 25 g. of acetaldehyde, and 10 g. of catalyst were stirred together for 16 hours at 24° C. The reaction product contained 112 g. of dibenzyl acetal.

EXAMPLE 8

A series of five runs was made wherein 40 g. of ethylene glycol and 10 g. of acetaldehyde were reacted at 24° C. for 16 hours in the presence of 5 g. of an acid-treated charcoal prepared as shown in Example 6. In each run, the catalyst was recovered and reused in the succeeding run. The conversion of aldehyde to produce 2-methyl-1,3-dioxolane declined from 83% to 59% during these runs.

EXAMPLE 9

Using the procedure and catalyst of Examples 6–8, a mixture of 19 g. of propylene glycol and 11 g. of acetaldehyde were reacted for 20 hours at 24° C. in the presence of 2 g. of acid-treated charcoal to produce a theoretical yield of 2,4-dimethyl-1,3-dioxolane.

EXAMPLE 10

In the presence of 5 g. an acid-treated coconut charcoal prepared as described in Example 6, 22 g. of acetaldehyde was reacted with 29 g. of acetone by mixing the reactants and catalyst at 0° C., warming the mixture slowly to room temperature, and stirring intermittently at this temperaure for 2 hours. The filtered reaction mixture consisted essentially of 4-hydroxy-2-pentanone.

EXAMPLE 11

Using 5 g. of a similar catalyst, a mixture of 29 g. of acetone and 59.5 g. of chloroform were reacted as above to produce 1,1,1-trichloro-2-methyl-2-propanol.

EXAMPLE 12

In the same way as in Example 11, 36 g. of butyraldehyde and 29 g. of acetone were reacted in the presence of a like quantity of the same charcoal catalyst to produce 4-hydroxy-2-heptanone.

EXAMPLE 13

A mixture of 50 g. of phenol, 6.2 g. of acetone, and 5 g. of an acid-treated charcoal such as described in Example 6 was stirred at 100–110° C. for 16 hours. The filtered reaction mixture was cooled, and a larger quantity of water was added, causing separation of p,p'-isopropylidenediphenol as white crystals essentially free of byproducts. The recovered catalyst and unreacted phenol were suitable for reuse in the process.

EXAMPLE 14

A mixture of 42.3 g. of phenol, 7.7 g. of acetaldehyde, and 5 g. of a catalyst such as used in the preceding example was stirred for 16 hours at room temperature. The filtered reaction mixture was analyzed and found to consist essentially of p,p'-ethylidenediphenol and unreacted phenol.

When Example 14 was repeated using as the catalyst a natural flake graphite which had been treated by the procedure of Example 1 with concentrated HCl, H$_3$PO$_4$, HClO$_4$, CrO$_3$, or glacial acetic acid, then washed and dried, no bisphenol was formed.

EXAMPLE 15

A solution of acetic acid in a tenfold molar excess of ethyl alcohol was stirred at 80° C. for 4 hours in the presence of an acid-treated graphite catalyst prepared as in Example 1. The reaction mixture was filtered to recover the catalyst and the experiment was repeated with the recovered catalyst. This procedure was then repeated three times. A theoretical yield (based on the conversion of acetic acid) of pure ethyl acetate was obtained in the first run while in the fifth run, the yield was 98% of the theoretical.

EXAMPLE 16

A solution of 30 g. of acetic acid in 52 g. of benzyl alcohol was stirred four hours at 80° C. with 5 g. of a catalyst prepared by treating an activated coconut charcoal with mixed concentrated nitric and sulfuric acids as described in Example 1. A theoretical yield of benzyl acetate was obtained.

EXAMPLE 17

Using another sample of the catalyst of the foregoing example, 23 g. of ethyl alcohol, 141 g. of oleic acid, and 5 g. of catalyst were stirred at 80° C. for 20 hours. A 63.5% yield of the theoretical quantity of ethyl oleate was obtained.

EXAMPLE 18

Five grams of an activated coconut charcoal which had been treated as described in Example 6 with mixed concentrated nitric and sulfuric acids was stirred with 88 g. of ethyl acetate and 18 g. of water at 73° C. for 2 hours. The ester was hydrolyzed to the equilibrium mixture containing about 54% ester.

EXAMPLE 19

Using five grams of a similar catalyst, 37 g. of ethyl formate was hydrolyzed to an equilibrium mixture by refluxing with 9 g. of water and the catalyst for four hours.

EXAMPLE 20

A series of six experiments was run, in each of which a mixture of 21.3 g. of the dimethyl ketal of acetone, 3.7 g. of water, and 2.5 g. of the catalyst prepared in Example 1 was stirred together for one hour at room temperature, the mixture was filtered to recover the catalyst, and fresh reactants were combined and stirred as before with the recovered catalyst. In all of these runs, the ketal was essentially completely hydrolyzed to acetone and methanol.

In the same way as shown in Example 20, acetone dimethyl ketal was essentially completely hydrolyzed using as the catalyst natural flake graphite treated as described in Example 1 with fuming nitric acid or fuming sulfuric acid. Similar results were obtained using catalysts prepared from Mexican "amorphous" graphite, synthetic graphite, or petroleum coke by treating these materials with a concentrated sulfuric-nitric acid mixture as described in Example 6.

In contrast, catalysts prepared from natural flake graphite as described in Example 1 except for using concentrated HCl, concentrated perchloric acid, concentrated phosphoric acid, glacial acetic acid, or CrO$_3$ as the acid gave only slight hydrolysis of the ketal when employed as in Example 20.

We claim:
1. In the process wherein a carbonyl compound is reacted with a phenol in the liquid phase at a temperature below about 200° C. in the presence of a supported strong acid catalyst to make a bisphenol, the improvement wherein said acid catalyst is a reusable acid-treated carbon catalyst prepared by a method comprising contacting non-diamond carbon with an acid selected from the group consisting of
   (1) fuming nitric acid,
   (2) fuming sulfuric acid, and
   (3) a mixture of 8–98% by weight of sulfuric acid of at least about 95% concentration and 92–2% by weight of nitric acid of at least about 65% concentration.
2. The process of claim 1 wherein the carbon, after being contacted with the acid, is washed with water to remove excess acid.
3. The process of claim 1 wherein the organic reaction is the reaction of an aldehyde or a ketone with a phenol to form a bisphenol.
4. The process of claim 1 wherein an aldehyde is reacted with phenol.
5. The process of claim 4 wherein the aldehyde is acetaldehyde.
6. The process of claim 1 wherein a ketone is reacted with phenol.

7. The process of claim 6 wherein the ketone is acetone.

References Cited

UNITED STATES PATENTS 1,788,466  1/1931  Lourens _____ 252—436
2,494,758  1/1950  Hartough et al. _____ 260—619A
1,137,373  4/1915  Aylsworth.
2,350,350  6/1944  Gresham.

FOREIGN PATENTS 1,051,864  3/1959  Germany _____ 260—619A

BERNARD HELFIN, Primary Examiner
N. P. MORGENSTERN, Assistant Examiner

U.S. Cl. X.R.

252—444; 260—340.9, 410.9, 479, 488, 541, 542, 593, 594, 611, 615, 633